United States Patent
Tsuria et al.

(10) Patent No.: US 7,530,085 B2
(45) Date of Patent: May 5, 2009

(54) METHOD AND SYSTEM FOR CONTROL OF BROADCAST CONTENT ACCESS

(75) Inventors: Yossi Tsuria, Jerusalem (IL); Moshe Shlissel, Jerusalem (IL); Ezra Darshan, Beit Shemesh (IL); Stephanie Wald, Givat Zeev (IL); Reuven Wachtfogel, Jerusalem (IL); Aharon Rozenhauz, Jerusalem (IL); Leonid Sandler, Jerusalem (IL)

(73) Assignee: NDS Limited, Middlesex (GB)

( * ) Notice: Subject to any disclaimer, the term of this patent is extended or adjusted under 35 U.S.C. 154(b) by 1354 days.

(21) Appl. No.: 10/182,639

(22) PCT Filed: Dec. 24, 2001

(86) PCT No.: PCT/IL01/01195

§ 371 (c)(1), (2), (4) Date: Jul. 30, 2002

(87) PCT Pub. No.: WO02/054765

PCT Pub. Date: Jul. 11, 2002

(65) Prior Publication Data

US 2003/0126594 A1 Jul. 3, 2003

Related U.S. Application Data

(60) Provisional application No. 60/259,892, filed on Jan. 2, 2001.

(51) Int. Cl.
H04N 7/16 (2006.01)

(52) U.S. Cl. .......................................... 725/25; 725/28

(58) Field of Classification Search .................... None
See application file for complete search history.

(56) References Cited

U.S. PATENT DOCUMENTS

| 4,685,131 A | 8/1987 | Horne ......................... 380/20 |
| 4,864,615 A | 9/1989 | Bennett et al. ................ 380/21 |
| 4,989,245 A | 1/1991 | Bennett ....................... 380/23 |
| 5,036,537 A * | 7/1991 | Jeffers et al. ................ 380/241 |
| 5,065,151 A | 11/1991 | Sandbrand ............. 340/825.22 |
| 5,231,665 A | 7/1993 | Auld et al. ..................... 380/20 |
| 5,235,415 A | 8/1993 | Bonicel et al. ................ 358/84 |
| 5,235,643 A | 8/1993 | Anderson et al. ............. 380/33 |
| 5,282,249 A | 1/1994 | Cohen et al. .................. 380/23 |

(Continued)

FOREIGN PATENT DOCUMENTS

EP 0858184 8/1998

(Continued)

OTHER PUBLICATIONS

Tom Hopkin, Pay Is The Key Word Iin PPV Expansion; [City Edition], May 9, 1994, Dayton Daily News (Newspaper).*

(Continued)

*Primary Examiner*—John W Miller
*Assistant Examiner*—Oschta Montoya
(74) *Attorney, Agent, or Firm*—Husch Blackwell Sanders LLP Welsh & Katz

(57) ABSTRACT

A method for controlling access to content, including preventing access to content that corresponds to a blacked out event, until at least one of a time criterion and payment criterion is met. Related methods and apparatus are also disclosed.

19 Claims, 2 Drawing Sheets

U.S. PATENT DOCUMENTS

| | | | | |
|---|---|---|---|---|
| 5,400,402 | A | 3/1995 | Garfinkle | 380/20 |
| 5,416,508 | A | 5/1995 | Sakuma et al. | 348/3 |
| 5,432,542 | A | 7/1995 | Thibadeau et al. | 348/6 |
| 5,446,490 | A | 8/1995 | Blahut et al. | 348/7 |
| 5,459,506 | A | 10/1995 | Bushnell | 348/7 |
| 5,481,609 | A | 1/1996 | Cohen et al. | 380/16 |
| 5,506,904 | A | 4/1996 | Sheldrick et al. | 380/23 |
| 5,512,934 | A | 4/1996 | Kochanski | 348/7 |
| 5,565,909 | A | 10/1996 | Thibadeau et al. | 348/9 |
| 5,619,247 | A * | 4/1997 | Russo | 725/104 |
| 5,621,793 | A | 4/1997 | Bednarek et al. | 380/20 |
| 5,640,452 | A | 6/1997 | Murphy | 380/5 |
| 5,914,712 | A | 6/1999 | Sartain et al. | 345/327 |
| 5,973,683 | A | 10/1999 | Cragun et al. | 345/327 |
| 5,978,649 | A | 11/1999 | Kahn | 455/3.1 |
| 6,009,116 | A | 12/1999 | Bednarek et al. | 375/200 |
| 6,047,162 | A | 4/2000 | Lazaris-Brunner et al. | 455/12.1 |
| 6,055,315 | A | 4/2000 | Doyle et al. | 380/242 |
| 6,108,365 | A | 8/2000 | Rubin et al. | 375/130 |
| 6,157,719 | A * | 12/2000 | Wasilewski et al. | 380/210 |
| 6,178,242 | B1 | 1/2001 | Tsuria | 380/201 |
| 6,216,265 | B1 | 4/2001 | Roop et al. | 725/54 |
| 6,249,532 | B1 | 6/2001 | Yoshikawa et al. | 370/486 |
| 6,249,639 | B1 | 6/2001 | Amada et al. | |
| 6,292,568 | B1 | 9/2001 | Akins, III et al. | 380/239 |
| 6,802,077 | B1 * | 10/2004 | Schlarb | 725/104 |
| 7,024,679 | B1 * | 4/2006 | Sie et al. | 725/101 |

FOREIGN PATENT DOCUMENTS

| | | |
|---|---|---|
| WO | 00/01149 | 1/2000 |
| WO | 01/52541 | 7/2001 |

OTHER PUBLICATIONS

Jim Moore, Sonic Home Playoffs Go On Pay-TV; [Final Edition], Mar. 31, 1992, Seattle Post—Intelligencer(Newspaper).*

Tom Hopkins, Pay Is The Key Word in PPV Expansion; [City Edition], May 9, 1994, Dayton Daily News.*

Jim Moore, Sonic Home Playoffs Go On Pay-TV; [Final Edition], Mar. 31, 1992, Seattle Post—Intellligence (Newspaper).*

P. Bar-Haim, "The NDS Guide to Conditional Access" 2000, p. 34.

H. Fields, "New Rulers . . . What Will Be The Rules?" Television Broadcast Online Daily website, Jun. 6, 2002.

United States Federal Communications Commission, "Fact Sheet—Cable Television Information Bulletin" Jun. 2000.

United States Federal Communications Commission, "Notice of Proposed Rulemaking" Jan. 7, 2000.

* cited by examiner

METHOD AND SYSTEM FOR CONTROL OF BROADCAST CONTENT ACCESS

CROSS-REFERENCE TO RELATED APPLICATION

This application claims priority under 35 U.S.C. § 120 from U.S. Provisional Application No. 60/259,892, filed Jan. 2, 2001, which is incorporated by reference herein in its entirety.

The present invention relates generally to a method and system for controlling electronic content access, such as but not limited to, programming access in a subscription television system, and particularly to control of programming blackout.

BACKGROUND OF THE INVENTION

Video programming may be distributed to a wide audience via various television systems, such as but not limited to, subscriber systems, satellite systems, direct broadcast satellite (DBS) and cable television (CATV) systems. Under certain contractual provisions, a specific programming event may be "blacked out" in certain geographic areas. For example, a sports event may be restricted to areas outside of the local market for ticket sales to the live event. Accordingly, many video programming delivery systems provide for geographic areas to be selectively blacked out for specific programming events.

Systems for controlling blacked out regions by geographic designation are well known. For example, U.S. Pat. No. 5,036,537 to Jeffers et al. describes a direct broadcast satellite system in which programming is distributed through a composite television signal which includes a plurality of levels of programming called tiers. Each tier carries a different variety of programming. A particular program may suit several tiers, much like a library index card listing having several possible topics of interest. Thus, a particular program may appear on one or more tiers.

Certain programs, whether paid for by subscription or on a pay-per-view basis, may be considered by the subscriber as inappropriate for viewing by the household or certain members thereof. Accordingly, the satellite system may incorporate a means for blocking out the tiers on which such programs are distributed so that they cannot be decoded and displayed by the subscriber's receiver unit. The system may also black out programming in a particular geographic area, for example, as mentioned above, certain sporting events such as baseball games, football games, boxing matches, and the like.

In the direct broadcast satellite system of U.S. Pat. No. 5,036,537, each receiver unit is provided with a memory for storage of a designation code representing its geographic location, and a memory for storage of indications of tiers upon which programs to be blacked out are to be distributed. After each receiver unit is provided with a designation code, the receiver units are globally addressed. Each receiver unit having a selected designation code stored therein is provided with a blackout tier indication for storage. When a program is selected for viewing, the receiver unit compares the program tier indication distributed with the program and the stored blackout tier indication. If the indications match, the selected program cannot be displayed.

In a related tier authorization scheme, U.S. Pat. No. 4,685,131 to Horne describes a program blocking method for use in direct broadcast satellite systems. Programming tiers are authorized for viewing on an impulse pay-per-view basis. A system operator controls individual receiver units to block the display of programming on selected tiers, e.g., blacked out sporting events, or objectionable content. The broadcast signal includes portions addressable to particular receiver units. These portions include a designation of tiers to be blocked and a command to store the designation of the tiers in the unit memory. Upon a command to display a program on a selected tier, the memory is accessed and the stored designation is compared with the selected tier. Receivers having stored designations corresponding to the selected tier are unable to display the program.

In yet another tier authorization scheme, U.S. Pat. No. 4,864,615 to Bennett et al. describes a system that may be used to collect subscribers into a blackout group which is assigned to a unique authorization tier. When a program or event begins, those descramblers that do not possess the proper authorization tier are prevented from decoding the received television signal and will therefore be blacked out for the program or event.

U.S. Pat. No. 6,292,568 to Akins, III et al. describes a cable television system that provides conditional access to services. The cable television system includes a headend from which service "instances", or programs, are broadcast, and a plurality of set top units for receiving the instances and selectively decrypting the instances for display to system subscribers. The service instances are encrypted using public and/or private keys provided by service providers or central authorization agents.

In the system of U.S. Pat. No. 6,292,568, blackout/spotlight information may be provided, which defines a geographic area which is to be blacked out or spotlighted by an instance of a service. The system uses coordinates to define a point in a geographical coordinate system defined by an entitlement agent or by an entitlement control message (ECM), and a blackout radius that is used to determine a region that is centered about the defined point. For example, if the blackout field of the ECM indicates that a blackout applies to the service, then the blackout information is used to determine whether the location specified by the position coordinates is within the blacked out region; if so, the system does not decrypt the control words and viewing is blocked.

In the event that a television broadcast is blacked out, it may be desired to provide alternative programming to the television subscribers during the blacked out event. For example, a CATV operator may manually switch to another available signal for the blacked out event. As another example, a program provider of the blacked out event may offer alternative programming from another satellite feed during the blackout. The CATV operator sends personnel to the headend site of the CATV system to connect another satellite receiver or retune the original satellite receiver to the alternate satellite feed during the blackout. Following the blackout, the original satellite receiver may be re-connected or manually tuned back to the primary satellite feed.

In addition to such manual switching arrangements, automatic switching or retuning of satellite receivers during a blackout is also known. U.S. Pat. No. 5,235,643 to Anderson et al. describes a remotely retunable receiver for use in a satellite video programming distribution system, which includes the capability to retune groups of subscribers to different satellite feeds during a blackout of a video programming event. To achieve flexible control over program blackouts, a receiver retune command message is selectively sent to desired groups of descramblers at CATV satellite downlinks. The retune command message identifies an alternate satellite feed and a time for which the satellite receiver is to tune to the alternate satellite feed. The receiver stores the retune command, and at the appropriate time retunes the satellite receiver to the identified alternate feed.

Conditional access mechanisms for providing access only to authorized users of content are well-known in the art; many such mechanisms include use of a removable security element such as a smart card. One attempt to provide such effective mechanisms is described in U.S. Pat. Nos. 5,282,249 and 5,481,609, both to Cohen et al. The disclosed system enables a signal containing media content to be broadcast widely, yet only to be played back or otherwise displayed by authorized users. This signal could contain a television program, for example. The signal is scrambled, such that the authorized users are able to unscramble the signal and play back or otherwise display the media content only with the proper security device, such as a smart card for example. Thus, widely received media content is still protected from access by unauthorized users.

Scrambled television data streams described in the Cohen et al. patents comprise both scrambled data representing television signals and coded control messages, also known as ECMs (Entitlement Control Messages). The ECMs of Cohen et al. comprise, in a coded form, data necessary for generating a control word (CW) which may be used to descramble the scrambled data representing television signals.

Data necessary for generating a control word is known in the background art to take many different forms and may include, in general, at least any of the following: a control word; an encrypted control word packet which is intended to be decrypted before use; and a seed to a generating function such as, for example, a one-way function which generates the control word upon input of the seed. Throughout the present specification and claims the terms "control word generating information" and "CW generating information" are used interchangeably to designate data necessary for generating a control word in any appropriate form, as described above.

Another attempted solution is described in published European Patent Application No. EP 0858184 and in corresponding U.S. Pat. No. 6,178,242, which disclose a digital recording protection system. The disclosed system enables the digital content to be sent in a digitally scrambled format, such that the digital content cannot be read and/or displayed without a key. The key is obtained from a control message, which is only sent to authorized users. Preferably, the key is obtained from coded information contained within the Entitlement Control Message, or ECM, for generating a control word associated with the ECM. Thus, only authorized users are able to correctly read and/or display the digital content.

In addition, the system and method described in European Patent Application No. EP 0858184 enable the authorized user to record and playback or otherwise display the digital content, while preventing the user from producing and distributing multiple playable copies of the digital content to other, non-authorized users. Therefore, the authorized user is able to fully use and enjoy the digital content, while the content itself is still protected from unauthorized use.

Personal video recorders (PVRs), which allow digital recording of broadcast or otherwise transmitted information such as television programs, are well known in the art. Salient features of one such system are described in published PCT Patent Applications WO 00/01149 and WO 01/52541, both assigned to NDS Limited.

The disclosures of all references mentioned above and throughout the present specification are hereby incorporated herein by reference.

SUMMARY OF THE INVENTION

The present invention seeks to provide improved methods and system for controlling access to electronic content. The present invention, in preferred embodiments thereof, may enable blacking out a programming event in a sector, such as but not limited to, geographic areas, subscription tiers, personal attributes, or purchasing activity, for example. In contrast to the prior art, the present invention, in preferred embodiments thereof, enables viewers in a blacked out sector to access a blacked out event at some later time, such as after the live event is over. In preferred embodiments of the present invention, the event may be viewed live upon payment of a predefined fee, typically, but not necessarily, more than a ticket price to the event.

In preferred embodiments of the present invention, the electronic content that corresponds to the blacked out event may be scrambled, and the scrambled content is prevented from being descrambled until a time criterion and/or payment criterion is met, as is described in detail hereinbelow.

There is thus provided in accordance with a preferred embodiment of the present invention a method for controlling access to content, the method including preventing access to content that corresponds to a blacked out event, until at least one of a time criterion and payment criterion is met.

In accordance with a preferred embodiment of the present invention the method includes preventing descrambling of a scrambled content that corresponds to the blacked out event, until at least one of the time criterion and the payment criterion is met.

Further in accordance with a preferred embodiment of the present invention the method includes preventing descrambling metadata associated with the content.

Still further in accordance with a preferred embodiment of the present invention the method includes identifying a blacked out sector and preventing a receiver in the blacked out sector from accessing the content that corresponds to the blacked out event, until at least one of the time criterion and the payment criterion is met.

In accordance with a preferred embodiment of the present invention the method includes, during at least a portion of the preventing, receiving at least a portion of the content.

Further in accordance with a preferred embodiment of the present invention the method includes, during at least a portion of the preventing, recording at least a portion of the content.

Still further in accordance with a preferred embodiment of the present invention the method includes playing back at least a portion of the content that was recorded, after at least one of the time criterion and the payment criterion has been met.

In accordance with a preferred embodiment of the present invention the time criterion includes a waiting period after commencement of the blacked out event, after which waiting period the content is accessible.

Further in accordance with a preferred embodiment of the present invention the time criterion includes a waiting period after termination of the blacked out event, after which waiting period the content is accessible.

Still further in accordance with a preferred embodiment of the present invention the payment criterion includes purchasing the content at a price at least higher than a ticket price to the blacked out event.

In accordance with a preferred embodiment of the present invention the method includes permitting purchasing the content after the time criterion has been met.

Further in accordance with a preferred embodiment of the present invention the method includes permitting purchasing the content at a price lower than the ticket price after the time criterion has been met.

Still further in accordance with a preferred embodiment of the present invention the method includes permitting access to the content for different prices at different periods of time.

In accordance with a preferred embodiment of the present invention the method includes receiving the content via a video-on-demand (VOD) service.

Further in accordance with a preferred embodiment of the present invention the method includes receiving the content via a near-video-on-demand (NVOD) service.

Still further in accordance with a preferred embodiment of the present invention the method includes receiving the content via a content delivery service that includes extended mass storage capability for at least one of storing electronic content, extending bandwidth and time-shifting electronic content.

There is also provided in accordance with a preferred embodiment of the present invention a system for controlling access to content, the system including a content provision system adapted to prevent access to content that corresponds to a blacked out event, until at least one of a time criterion and payment criterion is met.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
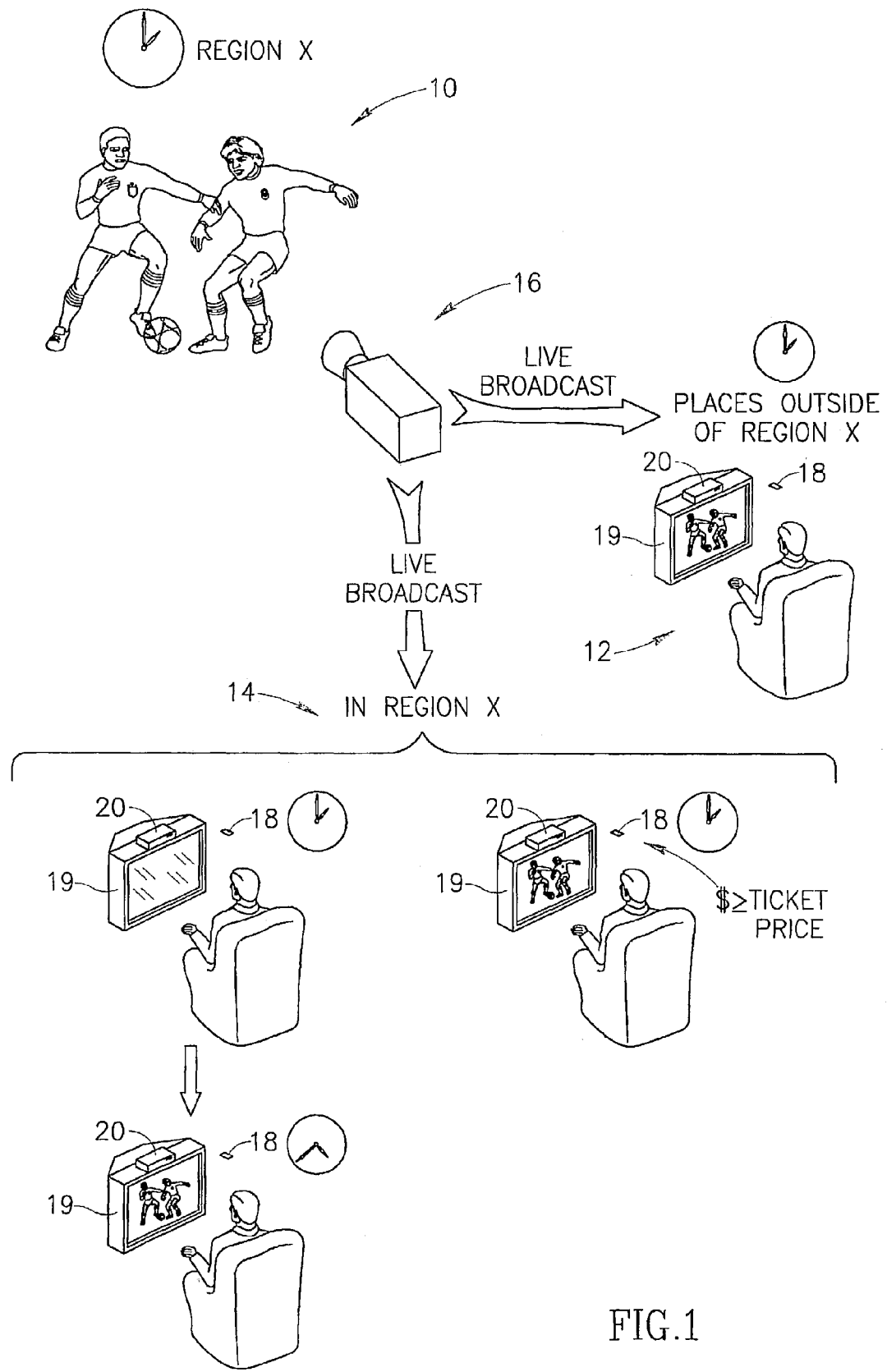
FIG. 1 is a simplified pictorial illustration of a method and system for controlling access to content, constructed and operative in accordance with a preferred embodiment of the present invention.
Figure 2:
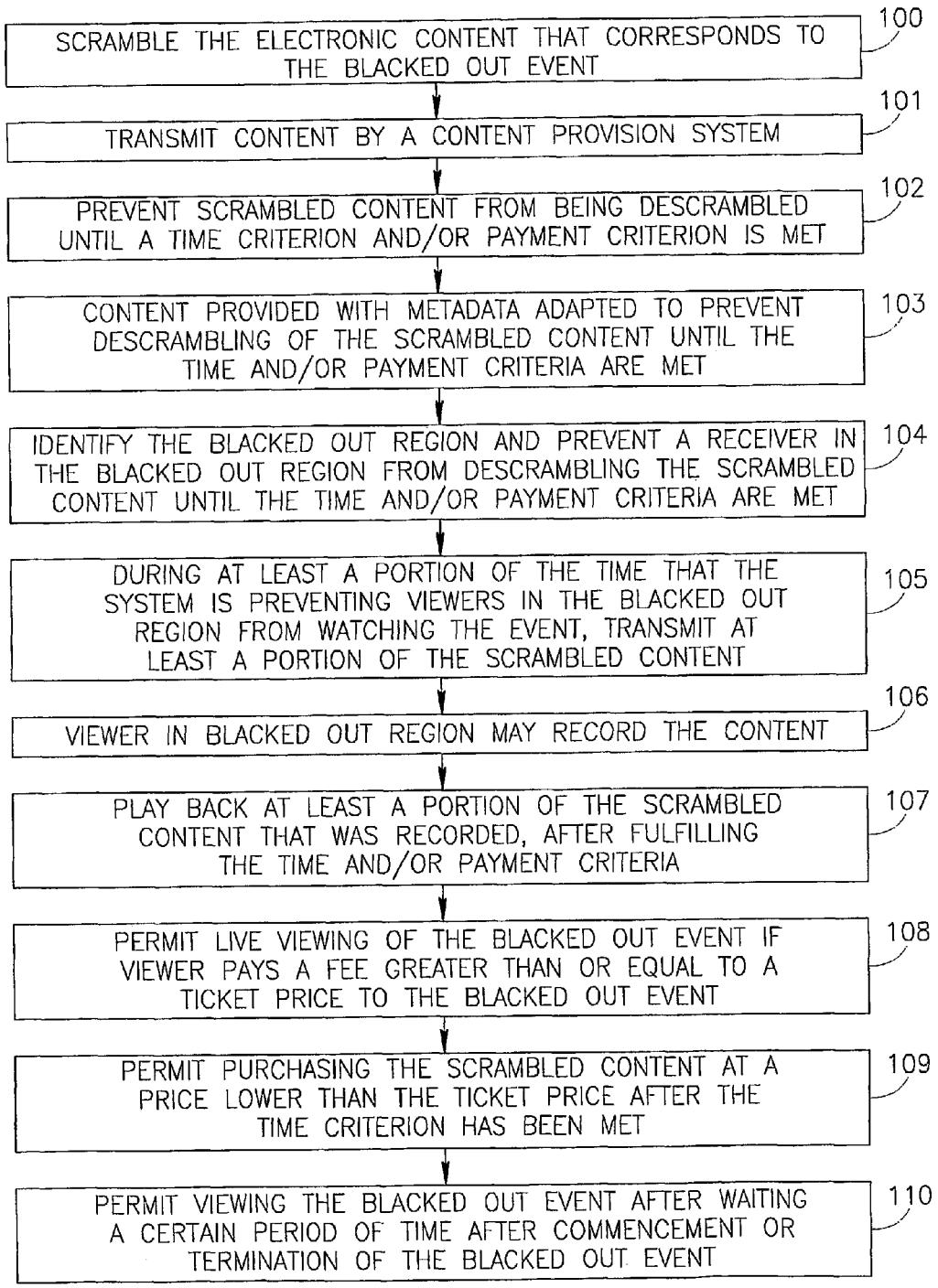
FIG. 2 is a simplified flow chart of a preferred implementation of the method and system of FIG. 1.

Reference is now made to FIGS. 1 and 2, which illustrate a method and system for controlling access to content, constructed and operative in accordance with an embodiment of the present invention.

The present invention enables blacking out a programming event in a certain sector, such as but not limited to, a geographic area. Alternatively or additionally, the blacked out sector may comprise, for example, subscription tiers, personal attributes, or purchasing activity. For example, a sporting event 10 may be taking place at 1:00 PM within a predefined radius of the event 10, referred to as sector or region X. In order to ensure that people will buy tickets to the sporting event 10 instead of staying at home and watching the event 10 on television, it may be desired to black out a live broadcast of the sporting event 10 to viewers living within region X (indicated by reference numeral 14 in FIG. 1) for the duration of the event 10. Viewers living outside of region X may be permitted to watch the event 10 on television (indicated by reference numeral 12 in FIG. 1).

In contrast to the prior art, the present invention may enable viewers in region X to record the event 10 and view it after the event 10 is over, or alternatively to view the event 10 live upon payment of a predefined fee, typically, but not necessarily, more than a ticket price to the event 10. In preferred embodiments of the present invention, the electronic content that corresponds to the blacked out event 10 may be scrambled (step 100, FIG. 2) and transmitted by a content provision (or delivery, the terms being used interchangeably) system 16 (step 101, FIG. 2). The content provision system 16 may comprise, without limitation, a television subscriber system that employs a smart card 18. The smart card 18 is a well-known security device that is used to permit or deny access to the electronic content for viewing on a television set 19 via an integrated receiver device (IRD) 20. The smart card 18 preferably includes control information that enables descrambling of the television signals for viewing by a user. One example of a suitable content provision system 16 is a near-video-on-demand (NVOD) system, which may provide features similar to VCR functional features (e.g., skip forward, skip backward, and pause features that emulate fast forward, rewind, pause VCR features). Another example is a video-on-demand (VOD) system, which may duplicate the VCR functional features exactly. VOD service may require a dedicated communication link.

Yet another example is a content delivery service that comprises extended mass storage capability for storing electronic content, extending bandwidth and/or time-shifting electronic content, for example. An example of such a system is the XTV (XTENDED TV) system commercially available from NDS Limited, One London Road, Staines, Middlesex TW18 4EX, United Kingdom. Salient features of the XTV system are described in published PCT Patent Applications WO 00/01149 and WO 01/52541, both assigned to NDS Limited and both referred to above.

The scrambled content is prevented from being descrambled until a time criterion and/or payment criterion is met (step 102), as is described in detail hereinbelow. The content may be scrambled by any appropriate method for enciphering, encrypting or encoding, the terms scrambling, enciphering, encrypting and encoding being used herein interchangeably. Likewise, the content may be descrambled by any corresponding appropriate method for deciphering, decrypting or decoding, the terms descrambling, deciphering, decrypting and decoding being used herein interchangeably.

The content may be provided with metadata that comprise conditional access features adapted to prevent access to the content, e.g., prevent descrambling of the scrambled content, until the time and/or payment criteria are met (step 103). In the examples described in step 101, the smart card is adapted to read the metadata and control operation of the IRD accordingly.

In addition, the system may identify the blacked out sector (in the illustrated example, region X) and prevent a receiver in the blacked out sector from descrambling the scrambled content (step 104). The sector may be identified in a variety of manners, such as but not limited to, the content provider supplying the sector information to the system of the invention, identification of the sector by means of addresses found in a database of television subscribers or by means of GPS (global positioning system), for example. Identification by means of GPS may be useful in preventing a person or receiver who is listed as being outside of region X from traveling to region X and trying to circumvent the system. For example, U.S. Pat. No. 5,621,793, entitled "TV Set Top Box Using GPS" and U.S. Pat. No. 6,009,116, entitled "GPS TV set top box with regional restrictions", both to Bednarek et al., the disclosures of which are incorporated herein by reference, describe a system that includes an integrated receiver decoder (IRD), also referred to as a set-top box, and a GPS receiver. The GPS receiver checks if the IRD is at an authorized location, and allows descrambling of video signals only if the location is authorized. A central access control system, remote from the customers or viewers, sends some GPS data in the transmission medium used to send video signals to the customers. The IRD establishes different geographic restrictions based on different specific video signals. For example, location-specific signals require that the set-top box be at a single fixed location for descrambling. Sector-specific signals are accessible only if the set-top box is in a geographic sector authorized for reception. Sector-exclusion signals are accessible only if the set-top box is outside of one or more sectors where reception is no allowed.

During at least a portion of the time that the system is preventing viewers in region X from watching the event 10, at least a portion of the scrambled content may be transmitted to some receiver, such as a receiver in region X or outside of region X (step 105). Viewers outside of region X may normally be permitted to watch the event 10 live. A viewer in region X may record the content (step 106), even though he/she may not be able to view the content live. The system permits playing back at least a portion of the scrambled content that was recorded, after fulfilling the time and/or payment criteria (step 107).

Examples of payment criteria are now described. It is noted that region X may comprise a small or large region, and may comprise a portion of a certain population or the entire population. Viewers in region X may be permitted to watch the event 10 live if they pay a fee greater than or equal to a ticket price to the blacked out event 10 (step 108). For example, if the most expensive ticket price is $100 per seat, then the viewer in region X may have to pay at least $100 to view the event live. However, it is noted that the present invention is not limited to permitting viewing in region X only upon payment of a fee higher than the highest ticket price, but rather any other price arrangement may be used as the payment criterion of the invention. Furthermore, the scrambled content may be purchased at a price lower than the ticket price after the time criterion has been met, such as but not limited to, allowing buying the content for a lower price after the event is over (step 109).

Examples of time criteria are now described. Viewers in region X may be permitted to watch the event 10 after waiting a certain period of time after commencement or termination of the blacked out event (step 110). For example, this may be accomplished by providing the scrambled content with metadata that permits descrambling the scrambled content only after a certain waiting period. As another example, suppose the blacked out event is not a sporting event but rather a movie with content deemed objectionable for young viewers. Adults in region X may be permitted to watch the event only after certain hours, such as after bedtime for the children. As yet another example, the time blackout may depend upon a user's entitlement. A user who has a "privileged" content delivery entitlement may be entitled to view the content with no blackout, whereas another user who has a "less-privileged" content delivery entitlement may be entitled to view the content upon payment of some fee. A user who has no content delivery entitlement may be denied access to the content until a certain time has passed.

In accordance with another preferred embodiment of the present invention, the time and payment criteria may be set to permit access to the content for different prices at different times in a day, week or other period of time. For example, the content may be accessed (e.g., viewed or heard) at a lower price during morning hours and at a higher price during evening hours (e.g., prime time hours), in addition to or independent of any geographical restrictions imposed upon the content.

It is appreciated that various features of the invention which are, for clarity, described in the contexts of separate embodiments, may also be provided in combination in a single embodiment. Conversely, various features of the invention which are, for brevity, described in the context of a single embodiment, may also be provided separately or in any suitable subcombination.

It will be appreciated by person skilled in the art that the present invention is not limited by what has been particularly shown and described herein above. Rather the scope of the present invention is defined only by the claims that follow.

What is claimed is:

1. A method for controlling access to content, the method comprising:

receiving content in a first geographical area in which access to the content is blacked out, the content corresponding to a blacked out event, the content being distributed by a content delivery system both to the first geographical area in which access to the content is blacked out and to a second geographical area in which access to the content is not blacked out;

preventing display of the content at a first user unit in the first geographical area at the time of receipt based, at least in part, on the first user unit being located in the first geographical area;

recording the received content at the first user unit; and allowing access to the recorded content at the first user unit after a time criterion is met, wherein said receiving content in the first geographical area occurs during at least a portion of time that display of the content at the first user unit in the first geographical area is being prevented in accordance with the preventing step, and said time criterion comprises waiting until after the event is over.

2. The method according to claim 1 wherein said content comprises scrambled content, and said allowing access comprises descrambling of the scrambled content after said time criterion is met.

3. The method according to claim 1 wherein said receiving content also comprises receiving metadata comprising conditional access information adapted to prevent descrambling of the scrambled content until said time criterion is met.

4. The method according to claim 1 and further comprising playing back at least a portion of said content that was recorded, after said time criterion has been met.

5. The method according to claim 1 and further comprising permitting purchasing said content after said time criterion has been met.

6. The method according to claim 5 and further comprising permitting purchasing said content at a price lower than a ticket price to said blacked out event after said time criterion has been met.

7. The method according to claim 1 and further comprising permitting access to said content for different prices at different periods of time.

8. The method according to claim 1 wherein said receiving comprises receiving said content via a video-on-demand (VOD) service.

9. The method according to claim 1 wherein said receiving comprises receiving said content via a near-video-on-demand (NVOD) service.

10. The method according to claim 1 wherein said receiving comprises receiving said content via a content delivery service that comprises extended mass storage capability for at least one of storing electronic content, extending bandwidth and time-shifting electronic content.

11. The method according to claim 1 and also comprising: allowing display of the content at a second user unit in the second geographical area at the time of receipt based, at least in part, on the second user unit being located in the second geographical area.

12. A system for controlling access to content, the system comprising:

a content receiver for receiving content in a first geographical area in which access to the content is blacked out, the content corresponding to a blacked out event, the content being distributed by a content delivery system both to the first geographical area in which access to the content is blacked out and to a second geographical area in which access to the content is not blacked out;

a conditional access subsystem for preventing display of the content at a first user unit in the first geographical area at the time of receipt based, at least in part, on the first user unit being located in the first geographical area, and for allowing access to the recorded content at the first user unit after a time criterion is met; and a recorder for recording the received content at the first user unit, wherein the conditional access subsystem is adapted to allow access to the recorded content at the first user unit after a time criterion is met, said time criterion comprising waiting until after the event is over, and said receiving content in the first geographical area occurs during at least a portion of time that display of the content at the first user unit in the first geographical area is being prevented in accordance with the operation of the conditional access subsystem.

13. The system according to claim 12 wherein said content comprises scrambled content, and the conditional access subsystem is adapted to allow access by descrambling the scrambled content after said time criterion is met.

14. The system according to claim 12 wherein said content receiver is also operative to receive metadata comprising conditional access information adapted to prevent descrambling of said scrambled content until said time criterion is met.

15. The system according to claim 12 wherein said system is adapted to play back at least a portion of said content that was recorded, after said time criterion is met.

16. The system according to claim 12 wherein said conditional access subsystem is adapted to permit access to said content for different prices at different periods of time.

17. The system according to claim 12 wherein said content receiver is operative to receive said content via a video-on-demand (VOD) service.

18. The system according to claim 12 wherein said content receiver is operative to receive said content via a near-video-on-demand (NVOD) service.

19. The system according to claim 12 wherein said receiving comprises receiving said content via a content delivery service that comprises extended mass storage capability for at least one of storing electronic content, extending bandwidth and time-shifting electronic content.

* * * * *